(12) United States Patent
Wilson

(10) Patent No.: US 6,910,372 B2
(45) Date of Patent: *Jun. 28, 2005

(54) NON-ATTACHED ELECTRONIC MONITORING DEVICE FOR TIRE

(75) Inventor: Paul B. Wilson, Tallmadge, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/394,971

(22) Filed: Mar. 21, 2003

(65) Prior Publication Data

US 2004/0182146 A1 Sep. 23, 2004

(51) Int. Cl.[7] .............................................. G01M 17/02
(52) U.S. Cl. ..................................................... 73/146.5
(58) Field of Search ............................. 73/146, 146.8, 73/146.2, 146.3, 146.4, 146.5; 340/440, 442

(56) References Cited

U.S. PATENT DOCUMENTS

| 3,894,421 A | 7/1975 | Sperberg |
|---|---|---|
| 4,067,235 A | 1/1978 | Markland et al. |
| 5,134,880 A | 8/1992 | Gerhard |
| 5,500,065 A | 3/1996 | Koch et al. |
| 5,938,868 A | 8/1999 | Miura et al. |
| 6,082,192 A | 7/2000 | Koch et al. |
| 6,360,594 B1 | 3/2002 | Koch et al. |
| 6,486,771 B1 | 11/2002 | Fuller et al. |
| 6,516,660 B1 | 2/2003 | Koch et al. |
| 6,543,277 B2 | 4/2003 | Koch et al. |
| 6,612,657 B1 * | 9/2003 | Fakhoury et al. ......... 301/105.1 |
| 2002/0097148 A1 * | 7/2002 | Yamagiwa et al. ......... 340/442 |

FOREIGN PATENT DOCUMENTS

EP          1 000 776 A2      5/2000

OTHER PUBLICATIONS

PCT International Search Report dated Sep. 13, 2004 in corresponding PCT application PCT/US2004/007951 (2 pages).

* cited by examiner

Primary Examiner—Michael Cygan
Assistant Examiner—Andre Allen
(74) Attorney, Agent, or Firm—Fred H. Zollinger, III

(57) ABSTRACT

A monitoring device for a pneumatic tire includes a body having a central portion with a monitoring assembly carried by the central portion. A plurality of spaced fingers project from the central portion of the body. The fingers support the monitoring assembly in a spaced located from the inner surface of the tire. The fingers also cushion the monitoring assembly and raise it above any liquid that may be disposed in the tire. In one embodiment, the fingers are designed to position the center of the device at the center of the tire sidewall. In this embodiment, the fingers may be configured to engage the tire and rim at the same time.

48 Claims, 3 Drawing Sheets

NON-ATTACHED ELECTRONIC MONITORING DEVICE FOR TIRE

BACKGROUND OF THE INVENTION

1. Technical Field

The present invention generally related to monitoring devices for pneumatic tires and, more particularly, to monitoring devices that are loosely disposed within the pneumatic tire and free to movement about bounded only by the rim and the tire mounted to the rim. Specifically, the present invention relates to the structure of a non-attached monitoring device that lifts the central portion of the monitoring device away from the footprint of the tire when the monitoring device is positioned in the footprint of the tire.

2. Background Information

Various type of tire monitoring devices are known in the art. Known monitoring devices are embedded within the tire, mounted to a surface of the tire, mounted to the rim (or the valve stem), or are loosely disposed within the tire. A common problem with the in-tire monitoring devices is that the tire and rim attenuate radio frequency transmissions from within the tire.

Various solutions have been proposed to improve radio frequency transmissions from with a tire. These solutions include boosting the power of the transmitter and improving the configuration of the antenna. In non-attached monitoring devices, the problem of radio transmissions through the tire is significant when the non-attached monitoring device is resting in the footprint of the tire because the monitoring device is next to the ground and immediately adjacent the steel belts disposed in the crown of the tire. Another problem with existing monitoring devices is that liquid disposed in the tire can attenuate the radio transmissions when the antenna of the monitoring device is disposed under the upper surface of the liquid.

BRIEF SUMMARY OF THE INVENTION

The invention provides a monitoring device for a pneumatic tire that has an inner surface; the monitoring device including a body having a central portion; a monitoring assembly carried by the central portion of the body; and the body including a plurality of spaced fingers projecting from the central portion of the body; the fingers adapted to support the monitoring assembly in a spaced located from the inner surface of the tire.

The invention also provides a wheel having a monitoring device. The wheel includes a rim having a radially outer surface; a tire having an inner surface; the tire mounted to the rim to define a chamber between the inner surface of the tire and the radially outer surface of the rim; a monitoring device disposed in the chamber; the monitoring device having a body having a central portion; a monitoring assembly carried by the central portion of the body; and the body including a plurality of spaced fingers projecting from the central portion of the body; the fingers adapted to support the monitoring assembly in a spaced located from the inner surface of the tire and the radially outer surface of the rim.

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
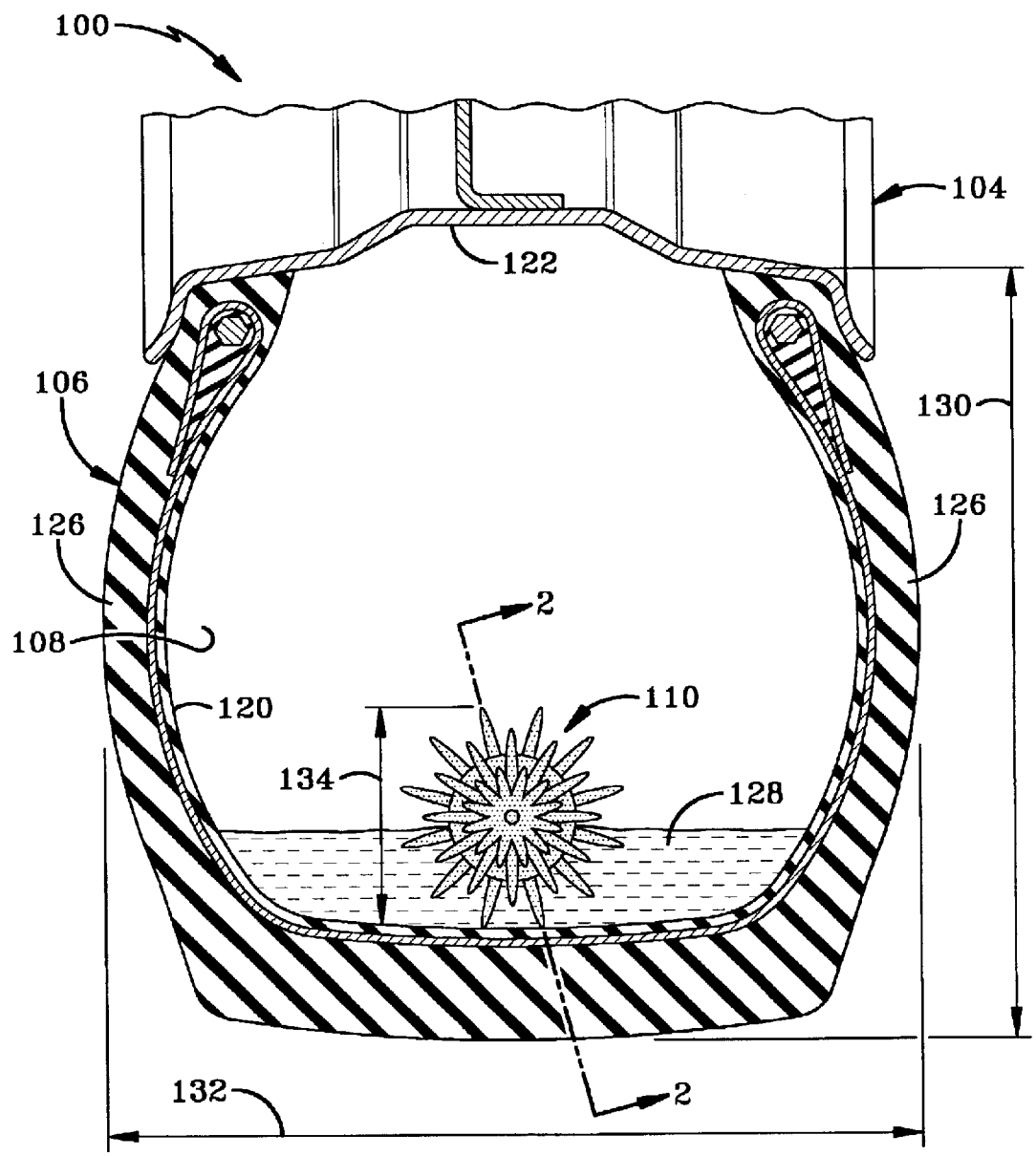
FIG. 1 is a section view of a wheel with a first configuration of the monitoring device of the invention disposed in the footprint of the tire.

A first configuration of a wheel having a monitoring device is indicated generally by the numeral 100 in FIG. 1. A second configuration for a wheel with a monitoring device is indicated generally by the numeral 102 in FIG. 3. In each configuration 100 and 102, the wheel includes a rim 104 and a tire 106 connected to the rim to form a sealed pneumatic chamber 108. Each configuration 100 and 102 further includes a monitoring device 110 loosely disposed within chamber 108 bounded only by tire 106 and rim 104. Monitoring device 110 includes a monitoring assembly 112 carried by a protective body 114 that has a central portion 116 and a plurality of fingers 118 projecting from the outer surface of central portion 116. Fingers 118 are adapted to support central portion 116 and monitoring assembly 112 in a spaced location from the inner surface 120 of tire 106 and the outer surface 122 of rim 104.

Fingers 118 lift the antenna 124 of monitoring assembly 112 away from inner surface 120 of tire 106 to reduce signal attenuation by the crown of tire 106. In the second configuration of wheel 102, fingers 118 are configured to substantially center monitoring assembly 112 with respect to the sidewall 126 of tire 106 and to limit the movement of monitoring device 110 within wheel 102. Fingers 118 will also help monitoring device 110 clear obstacles within tire 106 when monitoring device 110 is rolling along inner surface 120 of tire 106. Fingers 118 may also be sized to lift central portion 116 and monitoring assembly 112 above the liquid 128 in tire 106. Lifting monitoring assembly 112 and antenna 124 above liquid 128 increases the strength of the signals transmitted by antenna 124. Fingers 118 also function to cushion monitoring assembly 112 by absorbing impact forces experienced by monitoring device 110. In some large-size tires 106, the depth of liquid 128 may be three to eight inches.

Figure 3:
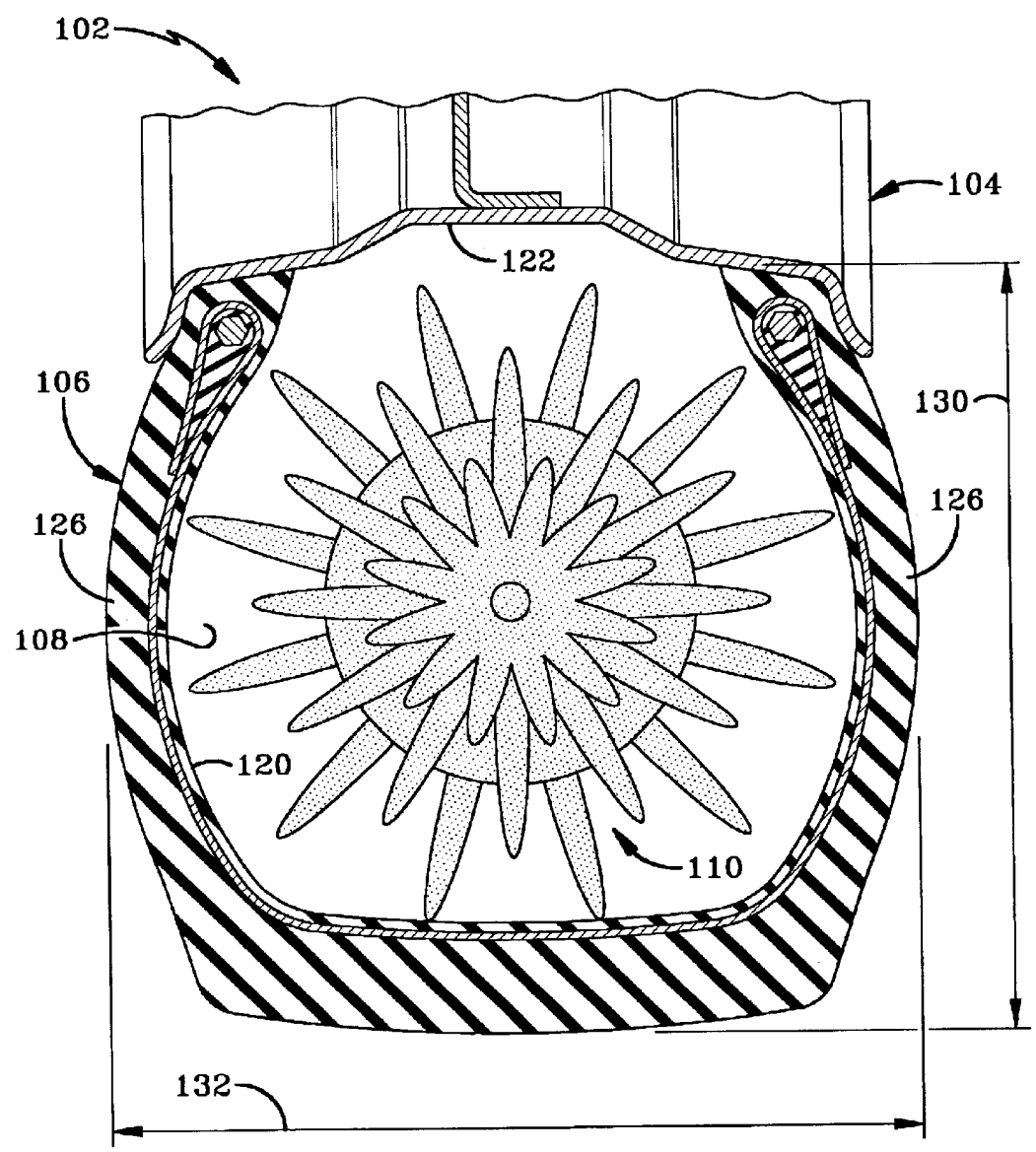
FIG. 3 is a section view of a wheel with a second configuration of the monitoring device of the invention disposed in the footprint of the tire.

FIG. 1 depicts an embodiment wherein fingers 118 of monitoring device 110 are sized to lift monitoring assembly 112 above the upper surface of liquid 128. FIG. 3 depicts an embodiment wherein fingers 118 are sized to position monitoring assembly 112 in line with the central portion of sidewall 126. The configuration of FIG. 3 also limits the overall movement of monitoring device 110 because the combined length of two opposed fingers 118 and the diameter of central portion 116 is substantially equal to or slightly greater than the overall height 130 of tire 106. This configuration is especially useful when the maximum section width 132 of tire 106 is equal to or larger than height 130. In tire embodiments wherein section width 132 is less than height 130, the outer diameter of monitoring device 110 is sized to be slightly less than maximum section width 132 less the thickness of sidewalls 126. Monitoring device 110 in first configuration 100 may be configured to position the uppermost portion of monitoring device 110 above a reference plane that passes through a quarter height 130 of tire 106 as indicated by the numeral 134. In other configurations, monitoring device 110 may be sized so that dimension 134 is greater than one-half of dimension 130.

Figure 2:
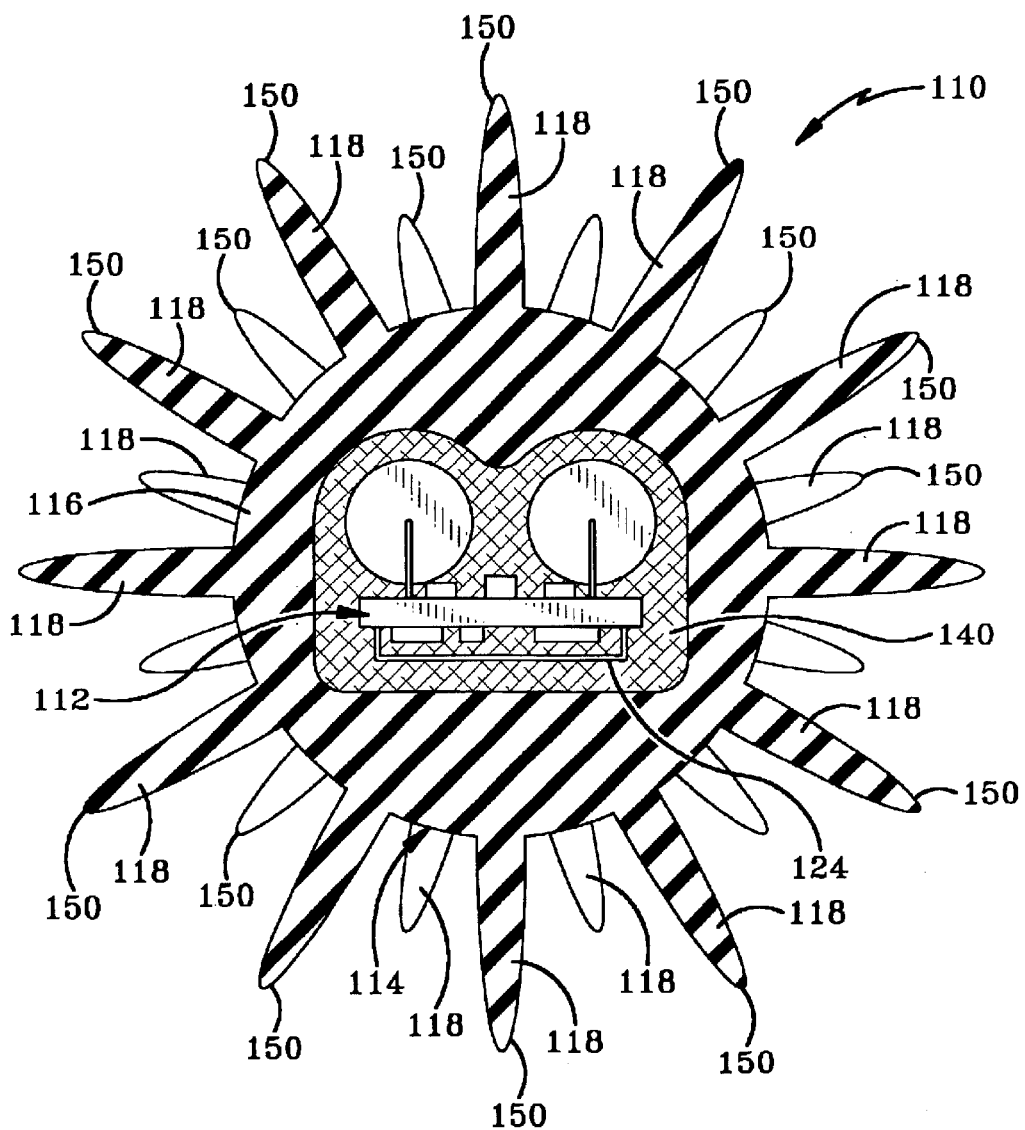
FIG. 2 is a section view taken along line 2—2 of FIG. 1.

As shown in FIG. 2, protective body 114 may include an encapsulation layer 140 that immediately surrounds monitoring assembly 112. Encapsulation material 140 may be an epoxy material that cures into a substantially rigid protective layer. Encapsulation material 140 may be an epoxy, a plastic, a rubber, or a variety of other materials known to those of ordinary skill in the art. Exemplary encapsulation materials 140 are described in column 4 of U.S. Pat. No. 6,030,478. The body of central portion 116 may be fabricated from a material softer than encapsulation material 140 such as a rubber, foam rubber, or foam material. The outer surface of central portion 116 may be water tight to prevent central portion 116 from filling with liquid 128. Any of a variety of materials may be used to form the body of central portion 116. Exemplary materials are silicone, rubber, and other foamable materials. The body of central portion 116 may also provide cushioning forces to monitoring assembly 112. Fingers 118 may be fabricated from the same material as central portion 116 and may integrally formed therewith. Fingers 118 may also be water tight to prevent the material of fingers 118 from absorbing or retaining liquid 128. In other embodiments, fingers 118 may be porous enabling them to absorb liquid 128. Fingers 118 are adapted to support monitoring device 110 without crumpling, bending, or buckling. Each finger 118 is also configured to withstand moderate G loads when monitoring device 110 is used with a wheel that rotates at high speeds. The combined weight of fingers 118 may be less than the weight of central portion 116 that includes the body of central portion 116, encapsulation material 140, and monitoring assembly 112.

In the exemplary embodiment of the invention depicted in the drawings, each finger 118 is substantially conical. Further, each finger 118 has a rounded tip 150 adapted to prevent monitoring device 110 from injuring inner surface 120 of tire 106. Tips 150 combine to define a sphere so that monitoring device 110 will freely roll about on a level surface. Fingers 118 may be evenly spaced about central portion 116 with six of fingers 118 disposed on three perpendicular reference axes. The length of each finger 118 may be half the diameter of central portion 116. In other embodiments, each finger 118 may have a length that is between one-quarter to three-quarters diameter of central portion 116.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A monitoring device for use inside a pneumatic tire; the pneumatic tire having an inner surface; the monitoring device comprising:
    a body having a central portion;
    a monitoring assembly carried by the central portion of the body; and
    the body including a plurality of spaced fingers projecting outwardly from the central portion of the body; the fingers being configured to support the central portion of the body spaced from the inner surface of the tire regardless of the orientation of the body with respect to the tire.

2. The monitoring device of claim 1, wherein each projecting finger is substantially conical.

3. The monitoring device of claim 2, wherein each substantially conical finger has a rounded tip.

4. The monitoring device of claim 1, wherein the projecting fingers have lengths wherein the combination of projecting fingers defines a sphere.

5. The monitoring device of claim 1, wherein the projecting fingers are evenly spaced about the body.

6. A monitoring device for a pneumatic tire that has an inner surface; the monitoring device comprising:
    a body having a central portion;
    a monitoring assembly carried by the central portion of the body;
    the body including at least six spaced fingers projecting from the central portion of the body; the fingers adapted to support the monitoring assembly in a spaced located from the inner surface of the tire; and
    six of the projecting fingers being disposed on three perpendicular axes.

7. The monitoring device of claim 1, wherein the projecting fingers are fabricated from a foam material.

8. The monitoring device of claim 7, wherein the foam material is a rubber material.

9. The monitoring device of claim 1, wherein the projecting fingers are fabricated from a silicone material.

10. The monitoring device of claim 9, wherein the projecting fingers are fabricated from a silicone foam.

11. The monitoring device of claim 1, wherein the central portion has a first weight and the combined plurality of fingers has a second weight; the first weight being larger than the second weight.

12. The monitoring device of claim 1, wherein the central portion of the body has a diameter; the length of each finger being at least ½ of the diameter of the central portion.

13. The monitoring device of claim 1, wherein the central portion of the body is substantially spherical.

14. The monitoring device of claim 1, wherein the central portion of the body is water-tight.

15. A wheel having a monitoring device; the wheel comprising:
    a rim having a radially outer surface;
    a tire having an inner surface;
    the tire mounted to the rim to define a chamber between the inner surface of the tire and the radially outer surface of the rim; and
    a monitoring device disposed in the chamber; the monitoring device having a body having a central portion; a monitoring assembly carried by the central portion of the body; the body including a plurality of spaced fingers projecting outwardly from the central portion of the body; the fingers supporting the central portion of the body spaced from the inner surface of the tire and the radially outer surface of the rim regardless of the orientation of the monitoring device with respect to the tire.

16. The wheel of claim 15, wherein the fingers of the monitoring device simultaneously engage the inner surface of the tire and the outer surface of the rim.

17. The wheel of claim 15, wherein the height of the monitoring device is greater than ¼ of the height of the tire.

18. The wheel of claim 17, wherein the height of the monitoring device is greater than ½ of the height of the tire.

19. The wheel of claim 18, wherein the height of the monitoring device is substantially equal to the height of the tire.

20. The wheel of claim 15, wherein each projecting finger is substantially conical.

21. The wheel of claim 20, wherein each substantially conical finger has a rounded tip.

22. The wheel of claim 15, wherein each of the projecting fingers has a length; the lengths being substantially equal such that the combination of projecting fingers defines a sphere.

23. The wheel of claim 15, wherein the projecting fingers are evenly spaced about the body.

24. A wheel having a monitoring device; the wheel comprising:

a rim having a radially outer surface;

a tire having an inner surface;

the tire mounted to the rim to define a chamber between the inner surface of the tire and the radially outer surface of the rim;

a monitoring device disposed in the chamber; the monitoring device having a body having a central portion; a monitoring assembly carried by the central portion of the body; the body including at least six spaced fingers protecting from the central portion of the body; the fingers adapted to support the monitoring assembly in a spaced located from the inner surface of the tire and the radially outer surface of the rim; and six of the projecting fingers being disposed on three perpendicular axes.

25. The wheel of claim 15, wherein the projecting fingers are fabricated from a foam material.

26. The wheel of claim 25, wherein the foam material is a rubber material.

27. The wheel of claim 15, wherein the projecting fingers are fabricated from a silicone material.

28. The wheel of claim 27, wherein the fingers are fabricated from a silicone foam.

29. The wheel of claim 15, wherein the central portion has a first weight and the combined plurality of fingers has a second weight; the first weight being larger than the second weight.

30. The wheel of claim 15, wherein the central portion of the body has a diameter; the length of each finger being at least ½ of the diameter of the central portion.

31. The wheel of claim 15, wherein the central portion of the body is substantially spherical.

32. The wheel of claim 15, wherein the central portion of the body is water-tight.

33. The wheel of claim 32, wherein the fingers are water tight.

34. The wheel of claim 32, wherein the fingers are porous.

35. A wheel having a monitoring device; the wheel comprising:

a rim having a radially outer surface;

a tire having an inner surface;

the tire mounted to the rim to define a chamber between the inner surface of the tire and the radially outer surface of the rim;

a monitoring device disposed in the chamber; the monitoring device having a body having a central portion; a monitoring assembly carried by the central portion of the body; the body including a plurality of spaced fingers projecting from the central portion of the body; the fingers adapted to support the monitoring assembly in a spaced located from the inner surface of the tire and the radially outer surface of the rim; and a liquid in the tire; the liquid having a maximum depth; each finger having a length longer than the maximum depth of the liquid.

36. The wheel of claim 35, wherein the combination of projecting fingers defines a sphere.

37. The wheel of claim 36, wherein each of the projecting fingers is fabricated from a foam material.

38. The wheel of claim 37, wherein the central portion has a first weight and the combined plurality of fingers has a second weight; the first weight being larger than the second weight.

39. The monitoring device of claim 6, wherein the projecting fingers have lengths wherein the combination of projecting fingers defines a sphere.

40. The monitoring device of claim 6, wherein each projecting finger is substantially conical.

41. The monitoring device of claim 6, wherein the projecting fingers are fabricated from a foam material.

42. The monitoring device of claim 6, wherein the central portion has a first weight and the combined plurality of fingers has a second weight; the first weight being larger than the second weight.

43. The monitoring device of claim 6, wherein the central portion of the body has a diameter; the length of each finger being at least ½ of the diameter of the central portion.

44. The wheel of claim 24, wherein the combination of projecting fingers defines a sphere.

45. The wheel of claim 44, wherein each of the projecting fingers is fabricated from a foam material.

46. The wheel of claim 45, wherein the central portion has a first weight and the combined plurality of fingers has a second weight; the first weight being larger than the second weight.

47. The wheel of claim 15, wherein six of the projecting fingers are disposed on three perpendicular axes.

48. The monitoring device of claim 1, wherein six of the projecting fingers are disposed on three perpendicular axes.

* * * * *